United States Patent
Kushida et al.

(10) Patent No.: US 6,622,752 B2
(45) Date of Patent: Sep. 23, 2003

(54) PRESSURE RELIEF VALVE

(75) Inventors: Takeo Kushida, Saitama Prefecture (JP); Etsuro Hozumi, Saitama Prefecture (JP); Akinori Yamazaki, Saitama Prefecture (JP); Kazumasa Kasahara, Saitama Prefecture (JP); Hideya Kikuchi, Saitama Prefecture (JP)

(73) Assignee: Bosch Automotive Systems Corporation (JP)

( * ) Notice: Subject to any disclaimer, the term of this patent is extended or adjusted under 35 U.S.C. 154(b) by 0 days.

(21) Appl. No.: 09/866,170

(22) Filed: May 25, 2001

(65) Prior Publication Data

US 2001/0052361 A1 Dec. 20, 2001

(30) Foreign Application Priority Data

Jun. 16, 2000 (JP) ........................ 2000-182113
Jun. 16, 2000 (JP) ........................ 2000-182114

(51) Int. Cl.[7] .............................................. F16K 15/04
(52) U.S. Cl. ................................... 137/539.5; 137/536
(58) Field of Search ............................. 137/539, 539.5, 137/536

(56) References Cited

U.S. PATENT DOCUMENTS

| 790,056 | A | * | 5/1905 | Hilger ....................... 137/539.5 |
| 2,415,258 | A | * | 2/1947 | Parker et al. ............. 137/539.5 |
| 4,219,042 | A | * | 8/1980 | St. Laurent, Jr. .............. 137/85 |
| 4,436,112 | A | * | 3/1984 | Atkins et al. ................ 137/510 |
| 4,706,705 | A | * | 11/1987 | Lee, II ..................... 137/539.5 |
| 5,107,890 | A | * | 4/1992 | Gute ............................ 137/539 |

FOREIGN PATENT DOCUMENTS

| JP | 9-105473 | 4/1997 |
| JP | 11-182242 | 7/1999 |

* cited by examiner

Primary Examiner—John Rivell
(74) Attorney, Agent, or Firm—Ostrolenk, Faber, Gerb & Soffen, LLP (57) ABSTRACT

The present invention provides a pressure relief valve, which achieves a reliable sealed structure in a valve holder 31 without the valve holder 31 jutting far out from a common rail, assures stability of operation of a valve spring 11 in a valve holder 31, and is capable of being manufactured at low cost and can be made compact. A first invention relates to a pressure relief valve, which focuses on making the low-pressure portion side end portion of a valve holder 31 a closed structure, and which has a valve spring 11 that is housed inside the valve holder 31; spring seats 34, 35 on which a valve spring 11 is seated; a valve seat 32 that is mounted to the valve holder 31; and a valve body 9, which is lifted from the valve seat 32 by fluid pressure, this pressure relief valve being characterized in that there is formed a closed end portion 36, which makes the low-pressure portion side end portion 31B of the valve holder 31 a closed state, and, in addition, is constituted so as to enable a valve spring 11 to be seated between the inner wall surface of closed end portion 36 and a spring seat 34, 35. A second invention focuses on making the spring seats 34, 35 of valve spring 11 a cup shape, and is characterized in that spring seats 34, 35 are housed in a slidable condition inside a valve holder 31 as cup-shaped spring seats 34, 35.

20 Claims, 7 Drawing Sheets

PRESSURE RELIEF VALVE

BACKGROUND OF THE INVENTION

1. Field of the Invention

The present invention relates to a pressure relief valve, and more particularly to a pressure relief valve, which mounts to a pressure accumulator (common rail) and other such pressure apparatus for a fuel supply system or fuel injection system of an internal combustion engine, such as a gasoline engine or diesel engine.

2. Description of the Related Art

A conventional pressure relief valve comprising a common rail and the like will be explained in general terms based on FIG. 7 and FIG. 8.

Figure 7:
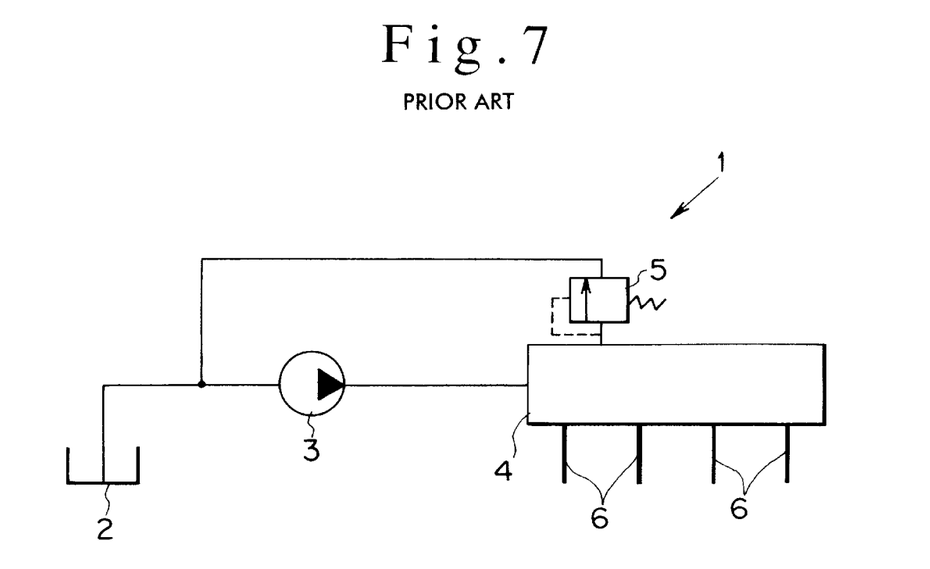
FIG. 7 is a schematic view of an example of a conventional internal combustion engine fuel injection system 1.

FIG. 7 is a simplified diagram of an example of a conventional internal combustion engine fuel injection system 1, the fuel injection system 1 having a fuel tank 2, a pressure pump 3, a common rail 4, a pressure relief valve 5, and an injector 6.

Pressure relief valve 5 functions as a safety valve for maintaining the pressure inside common rail 4 at less than a prescribed value, and, in addition, also functions as a pressure control valve when a pressure pump 3 control valve (not shown in the figure) malfunctions.

When this pressure relief valve 5 is mounted to common rail 4, the problem is that, in a conventional structure, the pressure relief valve 5 is long, jutting out lengthwise from the side of common rail 4, and, in addition, a completely sealed structure is difficult to achieve, the shape of the spring seat is complex, and it is costly.

Figure 8:
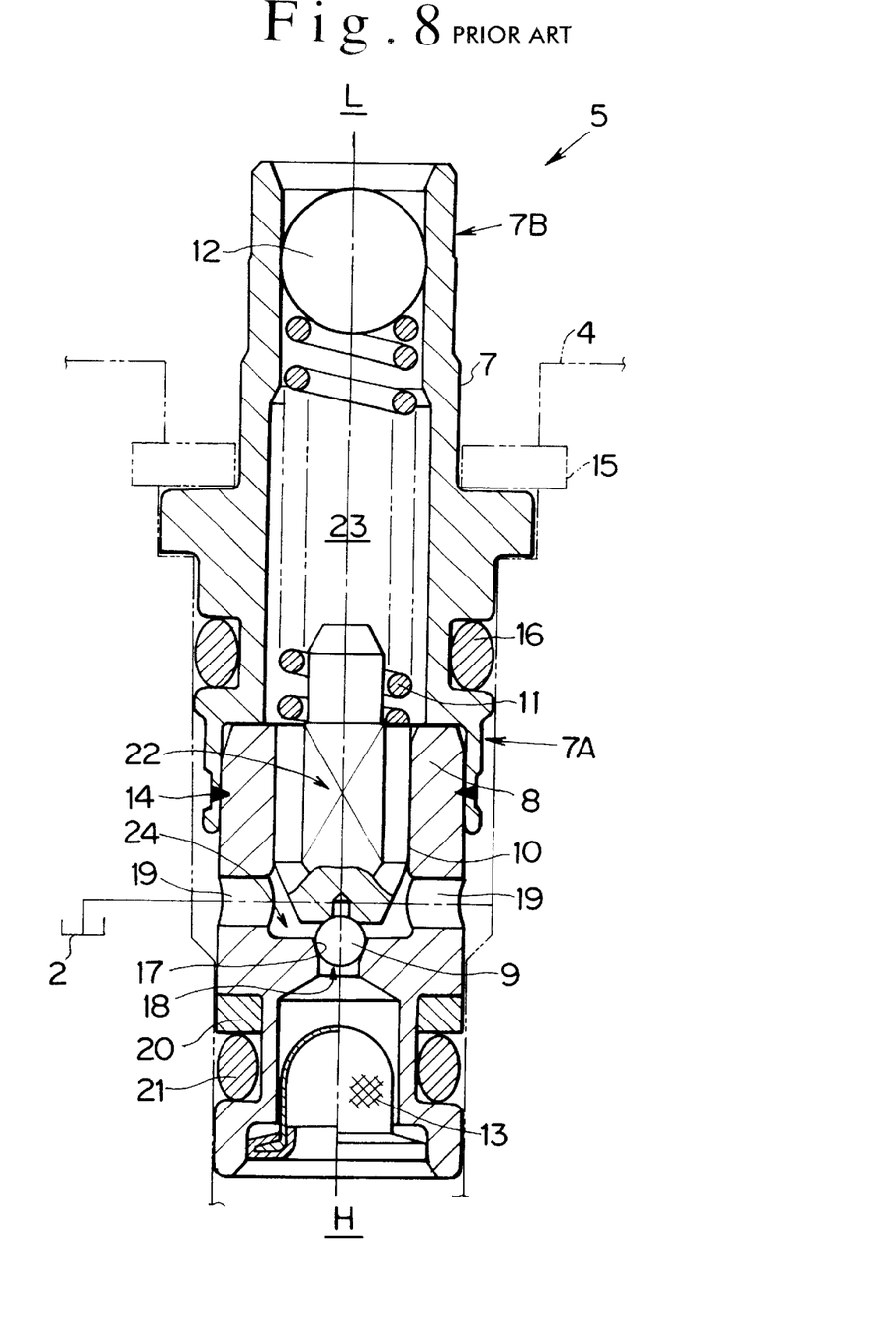
FIG. 8 is a cross-sectional view of a pressure relief valve 5 of a conventional internal combustion engine fuel injection system 1.

FIG. 8 is a cross-sectional view of pressure relief valve 5, pressure relief valve 5 having a valve holder 7, a valve seat 8, a ball valve 9 (valve body), a spring seat 10, a valve spring 11, a sealing ball 12, and a filter 13.

Valve holder 7 has a high-pressure portion side end portion 7A, which faces the high-pressure portion side H of the inside of common rail 4, and a low-pressure portion side end portion 7B, which faces the low-pressure portion side L of the outside, and is integrated with valve seat 8 by a weld portion 14 in accordance with laser welding, and in a state, wherein valve spring 11 is housed on the inside thereof, the inside thereof is sealed by sealing ball 12, which is press-fitted from the low-pressure portion side end portion 7B.

Furthermore, valve holder 7 is fastened to common rail 4 by a snap ring 15, and the high-pressure portion side H of common rail 4 and the low-pressure portion side L of common rail 4 are sealed by a first O-ring 16.

Valve seat 8 forms a valve seat surface 17 in which ball valve 9 is seated, and when ball valve 9 is lifted from valve seat surface 17, the high-pressure portion side H is connected to the atmospheric-pressure fuel tank 2 side via a linking passage 18 of the high-pressure side of valve seat surface 17 and a radial passage 19 of the low-pressure side, enabling the circulating flow of high-pressure fuel.

A backup ring 20 and a second O-ring 21 are provided for valve seat 8, sealing the high-pressure portion side H and the low-pressure portion side L.

Spring seat 10 is inside valve seat 8, slides axially therein, and seats valve spring 11 between itself and sealing ball 12, and, in addition, causes ball valve 9 to make contact at a prescribed injection valve opening pressure with valve seat surface 17 of valve seat 8 in accordance with the biasing force of valve spring 11.

A flat cut 22 is formed axially in spring seat 10, enabling the linkage of the spring chamber 23 of valve spring 11 and the valve chamber 24 of ball valve 9.

In a pressure relief valve 5 of a constitution such as this, the pressure inside the high-pressure portion side H of the common rail 4 is extremely high, and when this pressure is greater than the injection valve opening pressure resulting from valve spring 11, ball valve 9 is lifted from valve seat surface 17 of valve seat 8 against the biasing force of valve spring 11, and pressure escapes from the high-pressure portion side H to the fuel tank 2 side via linking passage 18, valve chamber 24 and radial passage 19.

However, the problem is that valve holder 7 of pressure relief valve 5 juts out far from common rail 4, and, in addition, because spring chamber 23 of valve holder 7 is closed off or sealed by only sealing ball 12, there is the possibility of fuel leaking to the outside from spring chamber 23.

Furthermore, spring seat 10 has a complex shape, and, in addition, there is the possibility of radial external force acting on spring seat 10 in line with the operation of valve spring 11, raising concerns of unstable operation, and, in addition, the durability thereof is a problem.

Further, the problem is that the position of ball valve 9, which receives the flow of fuel, is unstable, and there is the likelihood that hunting will occur.

Pressure relief valves are disclosed in, for example, Japanese Patent Application Laid-open No. H9-105473, and Japanese Patent Application Laid-open No. H11-182242.

SUMMARY OF THE INVENTION

With the foregoing problems in view, it is an object of the present invention to provide a pressure relief valve in which the valve holder does not jut far out from the common rail.

Further, an object of the present invention is to provide a pressure relief valve in which a reliable sealing structure is achievable in the valve holder.

Further, an object of the present invention is to provide a pressure relief valve, which is capable of being manufactured at low cost, and is capable of being made compact.

Further, an object of the present invention is to provide a pressure relief valve, which facilitates adjustment of the injection valve opening pressure, and is capable of being manufactured at low cost.

Further, an object of the present invention is to provide a pressure relief valve, which simplifies the shape of the spring seat.

Further, an object of the present invention is to provide a pressure relief valve capable of guaranteeing the operational stability of the valve spring in the valve holder.

Further, an object of the present invention is to provide a pressure relief valve, which is capable of preventing hunting in a valve body, such as a ball valve, and, in addition, is capable of enhancing the wear resistance of a contact portion.

A first invention has been made, focusing on making the low-pressure portion side end portion of a valve holder a closed structure, and is a pressure relief valve, having a valve holder, which has a high-pressure portion side end portion facing the high-pressure portion side, and a low-pressure portion side end portion facing the low-pressure portion side; a valve spring, which is housed inside this valve holder; a spring seat on which this valve spring is seated; a valve seat, which is mounted to the above-mentioned valve holder; and a valve body, which, in accordance with the pressure of the fluid of the above-mentioned high-pressure portion side, is lifted from this valve seat against the biasing force of the above-mentioned valve spring, this pressure relief valve being characterized in that there is formed a closed end portion for making the above-mentioned low-pressure portion side end portion of the above-mentioned valve holder a closed state, and, in addition, the above-mentioned valve spring can be seated between the inner wall surface of this closed end portion and the above-mentioned spring seat.

The above-mentioned closed end portion can be made deformable towards the inside of the above-mentioned valve holder.

The above-mentioned valve seat can be press fitted to the above-mentioned valve holder, and, in addition, it is possible to provide a stopper step portion for determining a press fitting position between the above-mentioned valve seat and the above-mentioned valve holder.

In a pressure relief valve according to the first invention, because the low-pressure portion side end portion of the valve holder is constituted so as to be a closed structure, this closed structure differs from a sealing structure for sealing the inside of a valve holder using a sealing ball as in a conventional pressure relief valve, and makes it possible to reliably seal the inside of the valve holder, and to reliably prevent the leaking of fuel or other fluids to the outside.

Furthermore, by deforming the closed end portion, which is a closed structure, toward the inside of the valve holder, it is possible to adjust the biasing force of the valve spring, and to easily adjust the injection valve opening pressure as a pressure relief valve, and it is possible to contribute toward lowering costs.

Further, according to a second invention, which focuses on making the spring seat of the valve spring a cup shape, is provided a pressure relief valve, having a valve holder, which has a high-pressure portion side end portion facing the high-pressure portion side, and a low-pressure portion side end portion facing the low-pressure portion side; a valve spring, which is housed inside this valve holder; a spring seat on which this valve spring is seated; a valve seat, which is mounted to the above-mentioned valve holder; and a valve body, which, in accordance with the pressure of the fluid of the above-mentioned high-pressure portion side, is lifted from this valve seat against the biasing force of the above-mentioned valve spring, this pressure relief valve being characterized in that the above-mentioned spring seat is a cup-shaped spring seat, and is housed in a slidable condition inside the above-mentioned valve holder.

The above-mentioned cup-shaped spring seat can be provided at the opposite ends of the above-mentioned valve spring, respectively.

A valve plate, which is capable of moving axially in an integrated condition with the above-mentioned valve body, and, in addition, is capable of sliding radially relative to the above-mentioned cup-shaped spring seat, can be interposed between the above-mentioned cup-shaped spring seat and the above-mentioned valve body.

In a pressure relief valve according to the second invention, because the spring seat of the valve spring is made into a cup shape, it is possible to load the necessary biasing force onto the valve body without having a complex shape as in a conventional pressure relief valve, and the pressure relief valve can be made compact and low-priced, and, in addition, it is also possible to curb the receiving of radial external force in line with the operation of the valve body, making it possible to ensure reliability and stability as a pressure relief valve.

Furthermore, by providing a valve plate, which is capable of moving axially in an integrated condition with the valve body, and, in addition, is capable of sliding radially relative to the cup-shaped spring seat, it is possible to stably maintain the position of the valve body resulting from the flow of a fuel or other such fluid, to prevent hunting, and to stabilize operation, and, in addition, it is possible to enhance the wear resistance of the valve body contact portion.

DESCRIPTION OF THE PREFERRED EMBODIMENTS

Next, a pressure relief valve according to the first embodiment of the present invention will be explained on the basis of FIG. 1. However, the same reference numbers will be assigned to parts that are the same as those in FIG. 7 and FIG. 8, and detailed explanations thereof will be omitted.

Figure 1:
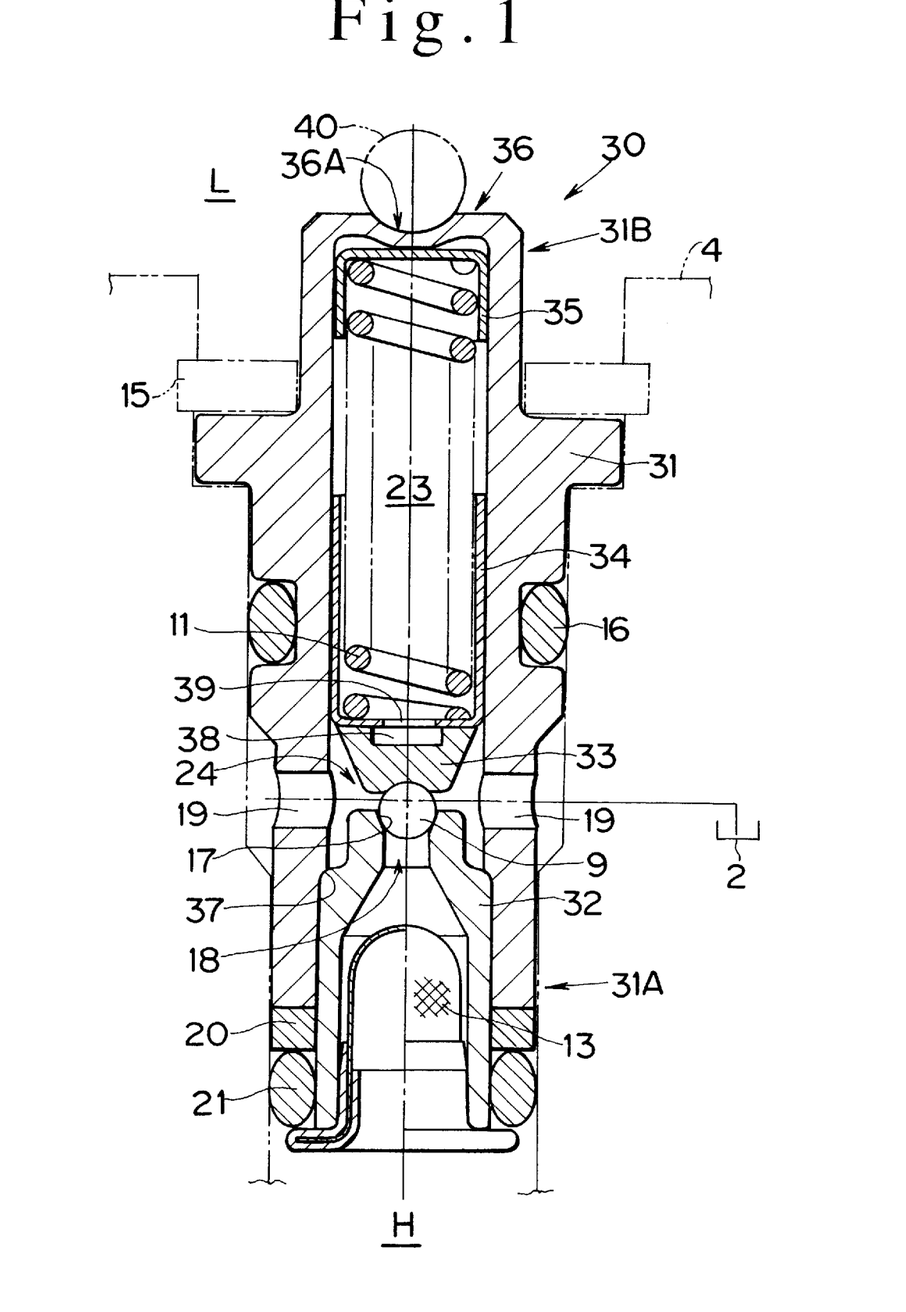
FIG. 1 is a cross-sectional view of a pressure relief valve 30 according to a first embodiment of the present invention.

FIG. 1 is a cross-sectional view of a pressure relief valve 30, having a valve holder 31, a valve seat 32, the above-mentioned ball valve 9 (valve body), a valve plate 33, a first cup-shaped spring seat 34 and a second cup-shaped spring seat 35, the above-mentioned valve spring 11, and the above-mentioned filter 13.

Valve holder 31 has a high-pressure portion side end portion 31A and a low-pressure portion side end portion 31B, and in a state, where valve spring 11, first cup-shaped spring seat 34 and second cup-shaped spring seat 35, valve plate 33, ball valve 9, and valve seat 32 are housed thereinside, the inside thereof is sealed by a closed end portion 36 of the low-pressure portion side L side.

Furthermore, valve holder 31 is fastened to common rail 4 by the above-mentioned snap ring 15, and the high-pressure portion side H of the inside of common rail 4, and the low-pressure portion side L of the outside of common rail 4 are sealed by the above-mentioned first O-ring 16, second O-ring 21 and backup ring 20.

Furthermore, the above-mentioned radial passage 19 is formed in valve holder 31.

Valve seat 32 forms valve seat surface 17 on which ball valve 9 is seated, and when ball valve 9 is lifted from valve seat surface 17, the high-pressure fuel can be circulated from the high-pressure portion side H to the fuel tank 2 side via linking passage 18, valve chamber 24, and radial passage 19.

Furthermore, valve seat 32 is press fitted and fastened to valve holder 31, and this is positioned by being pressed against a stopper step portion for determining a press fitting position 37 formed in valve holder 31.

Valve plate 33 takes on a truncated cone shape, ball valve 9 makes contact with the top surface thereof, and a radial linking groove 38 is formed on the bottom surface thereof.

Radial linking groove 38 is linked to a central orifice 39 formed in first cup-shaped spring seat 34, enabling the linkage of spring chamber 23 and valve chamber 24.

Valve plate 33 is constituted so as to make contact at a prescribed pressure in the axial direction with ball valve 9 and first cup-shaped spring seat 34, and, in addition, is capable of being shifted radially relative to first cup-shaped spring seat 34.

First cup-shaped spring seat 34 and second cup-shaped spring seat 35 can be constituted in a thin condition by stamping using stainless steel, valve spring 11 is placed therebetween, and can slide inside spring chamber 23 of valve holder 31, and first cup-shaped spring seat 34 can move in accordance with the opening and closing of ball valve 9. Second cup-shaped spring seat 35 makes contact with the surface of the inner wall of closed end portion 36.

Closed end portion 36 of the low-pressure portion side L extends the external end portion of valve holder 31 radially, and by pressing a spherical presser member 40 (virtual line in the figure) against the center portion thereof, closed end portion 36 can be deformed toward the inside of spring chamber 23.

In accordance with the extent of this deformed portion 36A, second cup-shaped spring seat 35 can be positioned and adjusted relative to first cup-shaped spring seat 34 inside spring chamber 23, making it possible to adjust the biasing force of valve spring 11.

In a pressure relief valve 30 of such a constitution, because low-pressure portion side L closed end portion 36 is formed in the end portion of valve holder 31 in place of sealing ball 12 (FIG. 8) in valve holder 7 of conventional pressure relief valve 5, it is possible to make the sealed structure of valve holder 31 even more reliable, and, in addition, the protruding length thereof from common rail 4 can also be shortened, enabling the entire pressure relief valve to be made compact.

Furthermore, as a spring seat, simply-constitutd first cup-shaped spring seat 34 and second cup-shaped spring seat 35 are employed, and, in addition, because closed end portion 36 is deformable toward the inside of valve holder 31, and since the injection valve opening pressure can also be easily adjusted in accordance with valve spring 11, it is also possible to cut costs.

Further, unlike conventional spring seat 10 (FIG. 8), valve spring 11 is housed inside first cup-shaped spring seat 34 and second cup-shaped spring seat 35, enabling the lessening of the radial external force placed on first cup-shaped spring seat 34 and second cup-shaped spring seat 35 by valve spring 11, and enabling the curbing of unstable operation, and, in addition, also making it possible to maintain the durability thereof at a predetermined level.

Furthermore, valve plate 33, which makes contact with ball valve 9, moves in an integrated condition with ball valve 9 in the axial direction, and because valve plate 33 is capable of radially shifting together with ball valve 9, even if ball valve 9 is not positioned on the central axis of valve seat 32 and first cup-shaped spring seat 34 due to a production error or an assembly error in valve seat 32 or valve seat surface 17 thereof, valve plate 33 shifts radially in line with the seating condition of ball valve 9 on valve seat surface 17, causing ball valve 9 to be securely seated on valve seat surface 17, and, in addition, it is possible to stabilize the position of ball valve 9 relative to the flow of fuel accompanying the commencement of fuel injection and the termination thereof.

Therefore, it is possible to prevent hunting due to ball valve 9 deviation from the center, or the instability of the movable portion in accordance with the opening and closing of the valve, and, in addition, it is possible to enhance the wear resistance of the contact surface between ball valve 9 and valve seat surface 17.

Furthermore, because a ball valve 9 biasing mechanism according to a valve spring 11 is used in combination with a valve plate 33 such as that described hereinabove and a simply-constituted first cup-shaped spring seat 34 and second cup-shaped spring seat 35, the constitution is simple, and it is possible to achieve a pressure relief valve having a stable pressure relief function or pressure control function, and, in addition, it is possible to cut costs.

Figure 2:
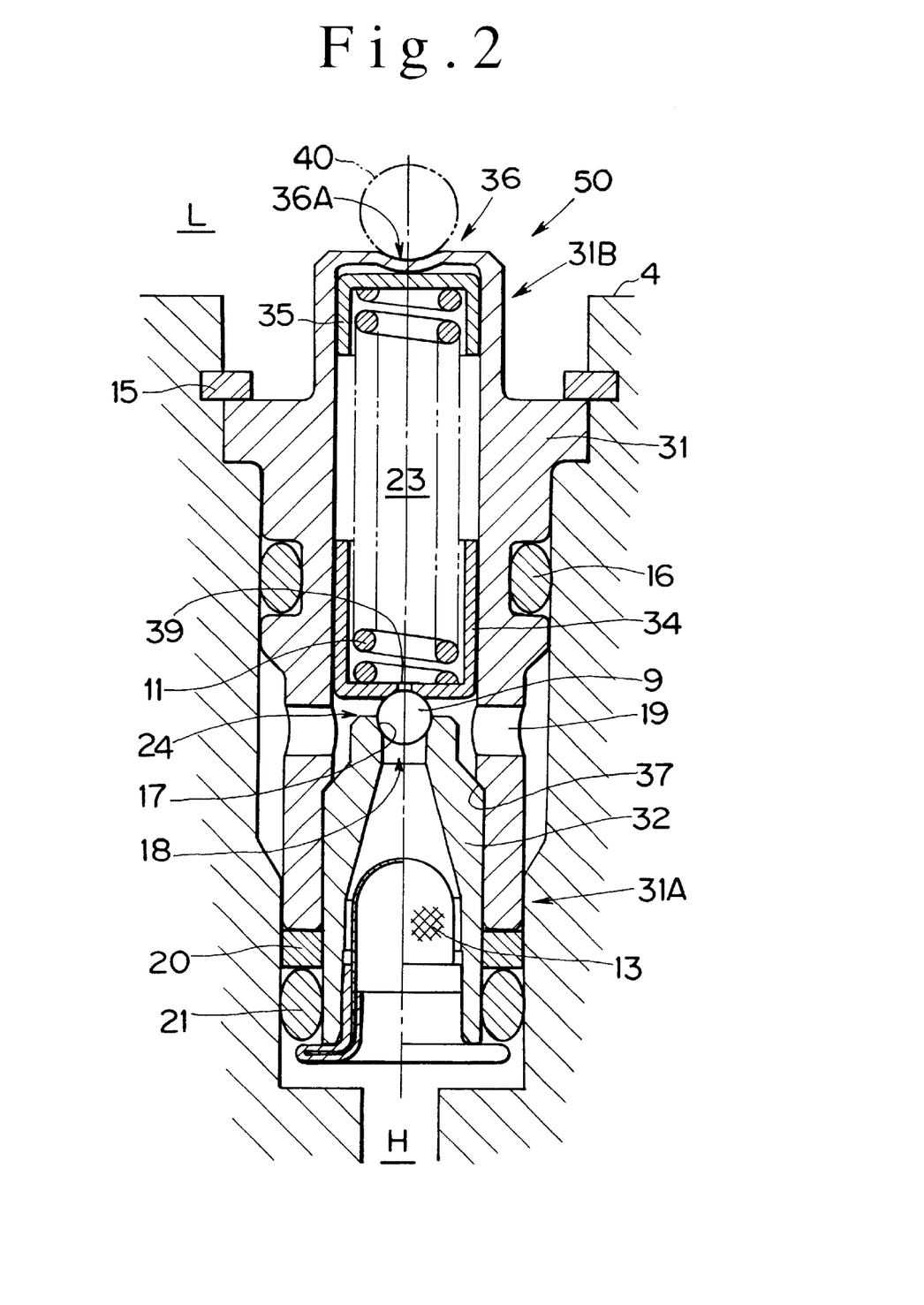
FIG. 2 is a cross-sectional view of a pressure relief valve 50 according to a second embodiment of the present invention.

FIG. 2 is a cross-sectional view of a pressure relief valve 50 according to the second embodiment of the present invention, and in pressure relief valve 50, the constitution is such that valve plate 33 in pressure relief valve 30 (FIG. 1) is omitted, and ball valve 9 makes direct contact with the end face of first cup-shaped spring seat 34.

That is, ball valve 9 is positioned between valve seat surface 17 of valve seat 32 and central orifice 39 of first cup-shaped spring seat 34, and mutually makes contact with these parts.

In a pressure relief valve 50 of a constitution such as this, because valve plate 33 in pressure relief valve 30 (FIG. 1) has been omitted, it is possible to further shorten the overall length of the pressure relief valve 50, and make it compact.

Further, because central orifice 39 of first cup-shaped spring seat 34 does not link spring chamber 23 and valve chamber 24 when ball valve 9 is seated on valve seat surface 17, when ball valve 9 is lifted, the pressure inside spring chamber 23 rises, and when this pressure exceeds a predetermined level, ball valve 9 is pushed back toward the seat, enabling the improved response of ball valve 9 at seating time.

Furthermore, the valve seat 32 part in pressure relief valve 30 of FIG. 1 and pressure relief valve 50 of FIG. 2 does not have to be an integrated structure, but rather can also be a two-body structure.

Figure 3:
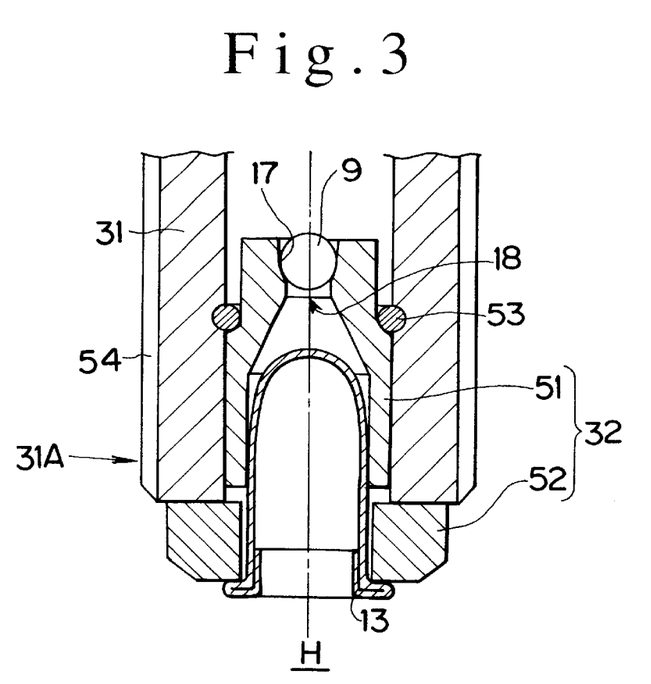
FIG. 3 is a cross-sectional view of a principle portion showing another example of the valve holder 31 and valve seat 32 in pressure relief valve 30 of FIG. 1 and pressure relief valve 50 of FIG. 2.

That is, FIG. 3 is a cross-sectional view of a principal portion showing another example of the valve holder 31 and valve seat 32 parts, and valve seat 32 is constituted from a first valve seat part 51 and a second valve seat part 52.

The press-fitted position of first valve seat part 51 is controlled by a stopper pin 53 (stopper step portion for determining a press fitting position) resulting from a wire member attached to the surface of the inner wall of valve holder 31.

Second valve seat part 52 is positioned in the high-pressure portion side H side of valve holder 31, enabling the end portion of filter 13 to be mounted thereto.

Furthermore, a high-pressure side male screw portion 54 is formed on valve holder 31, making it possible to screw valve holder 31 into common rail 4, and enabling the shape of valve holder 31 and valve seat 32 at the filter 13 part to be simplified.

Figure 4:
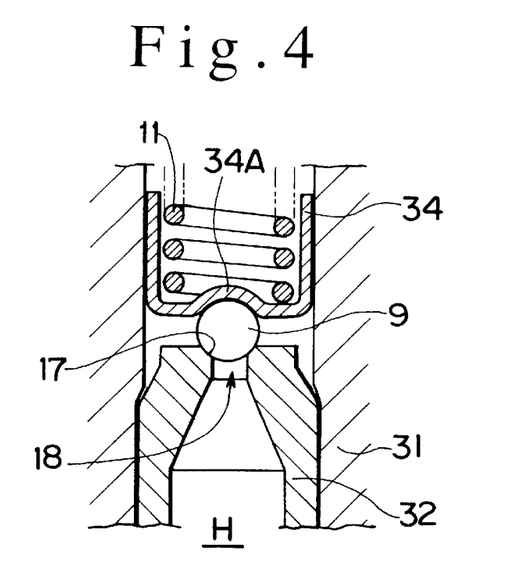
FIG. 4 is a cross-sectional view of a principle portion showing another example of the ball valve 9 and first cup-shaped spring seat 34 in pressure relief valve 50 of FIG. 2.

Furthermore, FIG. 4 is a cross-sectional view of a principal portion showing another example of the ball valve 9 and first cup-shaped spring seat 34 parts, and, as shown in the figure, by forming on the ball valve 9 side of first cup-shaped spring seat 34 an arc-shaped seat portion 34A of a cross-sectional arc shape, which enables this first cup-shaped spring seat 34 to be seated, it is possible to improve the seating condition of the ball valve 9 on first cup-shaped spring seat 34.

Figure 5:
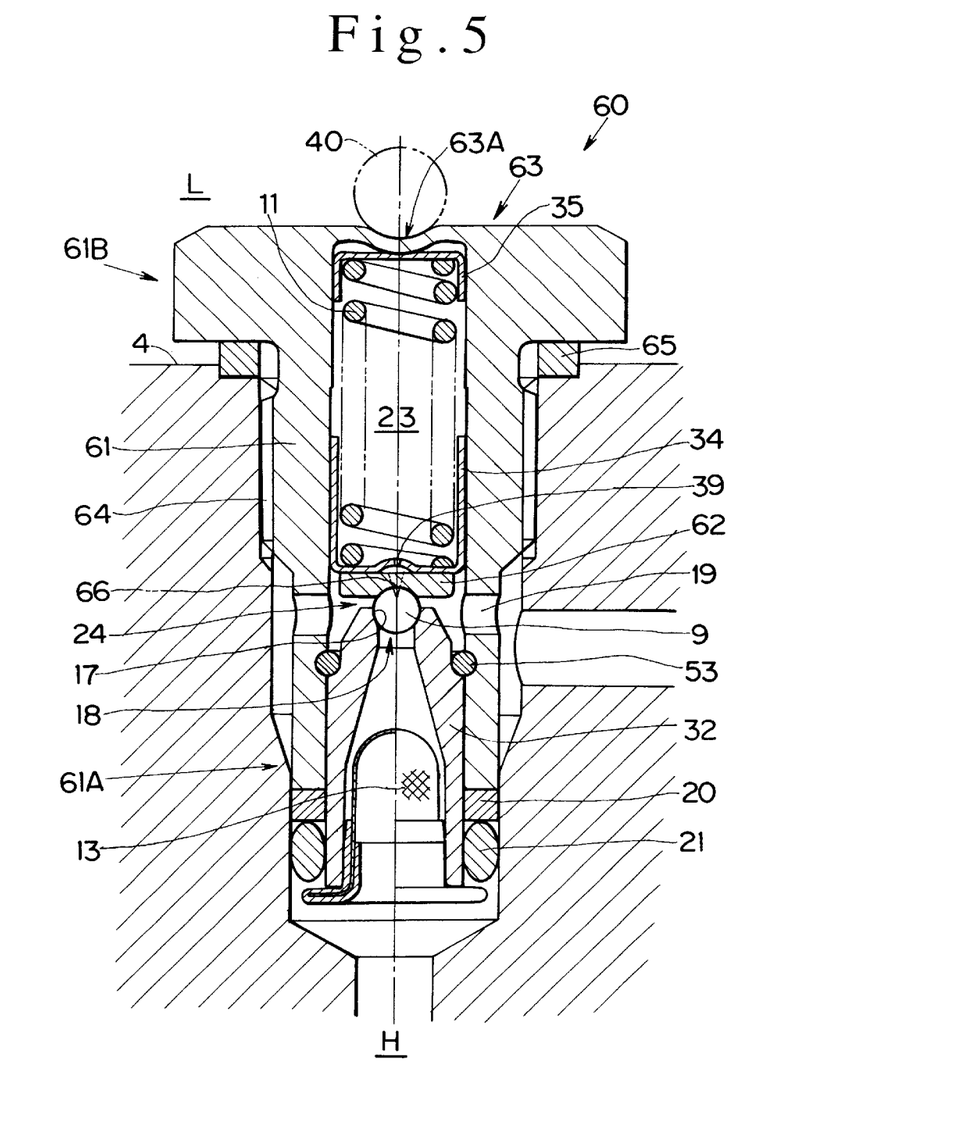
FIG. 5 is a cross-sectional view of a pressure relief valve 60 according to a third embodiment of the present invention.

FIG. 5 is a cross-sectional view of a pressure relief valve 60 according to the third embodiment of the present invention, and in pressure relief valve 60, a bolt-shaped valve holder 61 is used in place of valve holder 31 in FIG. 1, and, in addition, a flat valve plate 62 is interposed between ball valve 9 and first cup-shaped spring seat 34 in place of valve plate 33.

Valve holder 61 has a high-pressure portion side end portion 61A and a low-pressure portion side end portion 61B, the low-pressure portion side end portion 61B is shaped like the head of a bolt, and a deformable portion 63A can be formed in the closed end portion 63 of the low-pressure portion side L the same as valve holder 31 of FIG. 1, making it possible to adjust the biasing force of valve spring 11 housed thereinside.

Furthermore, a low-pressure side male screw portion 64 can be formed in valve holder 61, enabling valve holder 61 to be screwed into common rail 4, and using a gasket or other such sealing material disposed between low-pressure portion side end portion 61B and common rail 4 makes it possible to omit first O-ring 16.

Even in a pressure relief valve 60 of a constitution such as this, by using valve plate 62, it is possible to absorb the shifting of ball valve 9 from the axis and to prevent hunting the same as in pressure relief valve 30 of FIG. 1.

Further, the same as pressure relief valve 30 of FIG. 1, the low-pressure portion side L is closed, enabling an overall reduction in size, a screw space (a space for forming the low-pressure side male screw portion 64) can be ensured, and, in addition to the second O-ring 21 and backup ring 20, it is possible to achieve a sealed structure between the high-pressure portion side H and the low-pressure portion side L by simply screwing valve holder 61 into common rail 4, thus also enhancing mountability to common rail 4.

Furthermore, as indicated by the virtual line in FIG. 5, ball valve 9 and valve plate 62 can be integrated by a weld portion 66 resulting from laser welding, for example.

Figure 6:
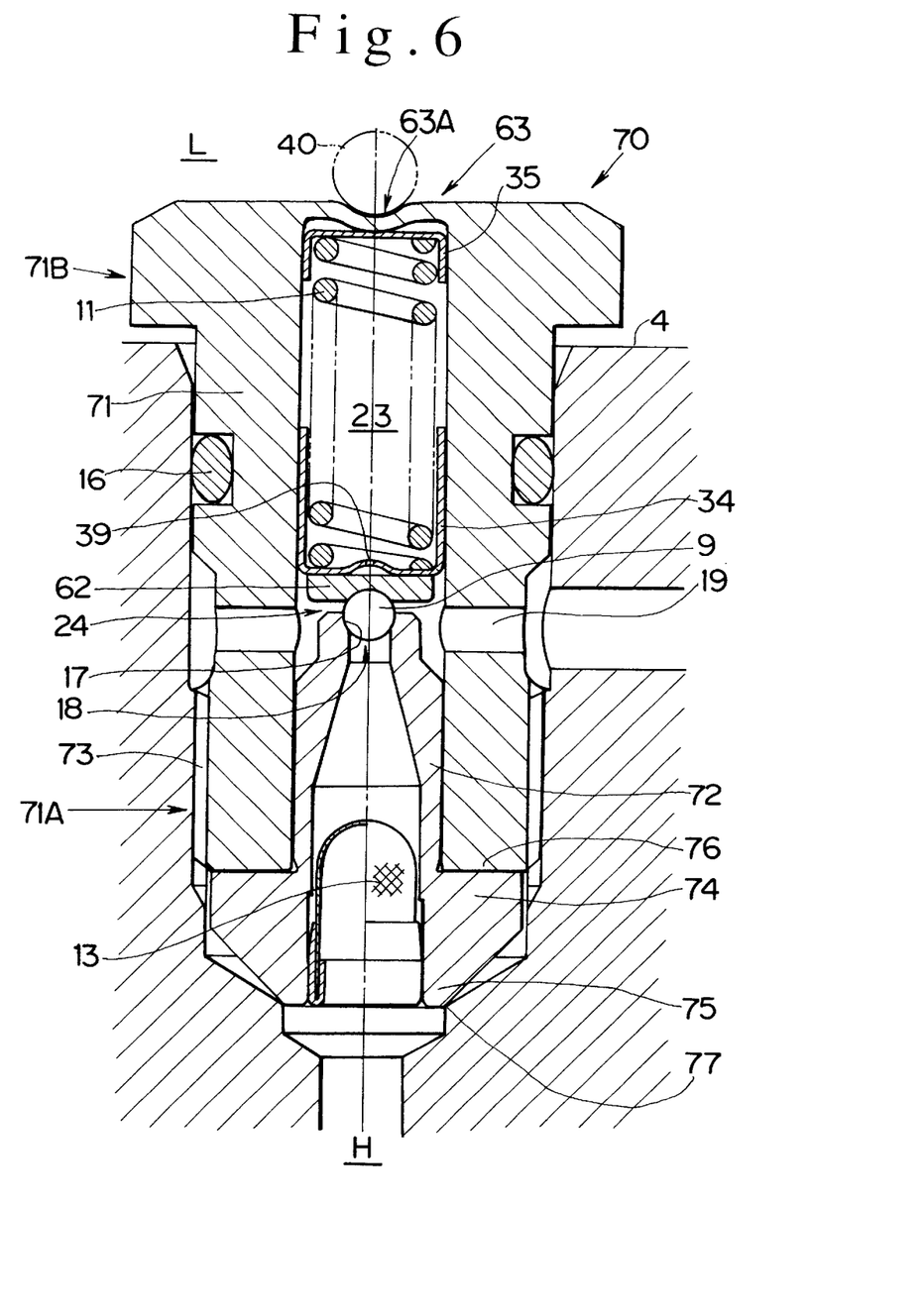
FIG. 6 is a cross-sectional view of a pressure relief valve 70 according to a fourth embodiment of the present invention.

FIG. 6 is a cross-sectional view of a pressure relief valve 70 according to the fourth embodiment of the present invention, and in pressure relief valve 70, valve plate 62 is used the same as in pressure relief valve 60 of FIG. 5, but a bolt-shaped valve holder 71 is used in place of bolt-shaped valve holder 61, and a valve seat 72 is used in place of valve seat 32.

Valve holder 71 has a high-pressure portion side end portion 71A and an low-pressure portion side end portion 71B, the low-pressure portion side end portion 71B is shaped like the head of a bolt, and deformable portion 63A can be formed in the closed end portion 63 of the low-pressure portion side L the same as valve holder 61 of FIG. 5, making it possible to adjust the biasing force of valve spring 11 housed thereinside.

Furthermore, a high-pressure side male screw portion 73 can be formed in the high-pressure portion side end portion 71A of valve holder 71, enabling valve holder 71 to be screwed into common rail 4, and making it possible to omit second O-ring 21.

Valve seat 72 forms valve seat surface 17 and linking passage 18 in the low-pressure portion side L the same as valve seat 32 (FIG. 1), and, in addition, a stopper portion 74 and a seat portion 75 are formed in place of backup ring 20 and second O-ring 21 in the high-pressure portion side H.

Stopper portion 74 makes contact with a stopper end portion 76 (stopper step portion for determining a press fitting position) of valve holder 71, and seat portion 75 makes contact with a metal seat 77 of common rail 4, respectively, and stopper portion 74 and stopper end portion 76 determine the press fitted position of valve seat 72, and, in addition, seat portion 75 and metal seat portion 77 form a sealed structure.

In a pressure relief valve 70 of such a constitution, it is possible to reduce overall size the same as in pressure relief valve 60 of FIG. 5, and, in addition, because a sealed structure is provided in the high-pressure portion side H in accordance with seat portion 75 and metal seat portion 77, and a screw structure is also provided in accordance with high-pressure side male screw portion 73, fuel leakage can be prevented with increased certainty.

Further, because a stopper end portion 76 is formed in high-pressure portion side end portion 71A for positioning when press fitting valve seat 72 to high-pressure portion side end portion 71A of valve holder 71, there is no need to form stopper step portion for determining a press fitting position 37 and make it protrude toward the inside as in valve holder 31 of FIG. 1, and the diameter of valve spring 11 on the inside of valve holder 71 can be designed larger.

As explained hereinabove, according to the present invention, because a valve holder is constituted as a sealed structure, it is possible to shorten the protrusion length from a pressure apparatus part, such as a common rail, and to reduce the overall size of a pressure relief valve, and, in addition, it is possible to improve assembly characteristics, and to make mounting to a common rail or the like easy. Furthermore, because the spring seat of a valve spring is constituted in a cup shape, a simpler, more compact, and less costly constitution is possible, and, in addition, the reliability and stability of a pressure relief valve can be ensured.

What is claimed is:

1. A pressure relief valve, comprising:
   a valve holder having a high-pressure portion side end portion facing a high-pressure portion side and a low-pressure portion side end portion facing a low-pressure portion side;
   a valve spring, which is housed inside this valve holder;
   a spring seat on which this valve spring is seated;
   a valve seat, which is mounted to said valve holder; and
   a valve body, which is lifted from this valve seat against the biasing force of said valve spring by fluid pressure of said high-pressure portion side,
   wherein said low-pressure portion side end portion of said valve holder is closed to form a closed end portion, and, provision is made such that said valve spring is capable of being seated between the inner wall surface of this closed end portion and said spring seat, and wherein said closed end portion is configured to be deformed from an outside of the pressure relief valve toward an inside of the pressure relief valve by a separated and external presser member.

2. The pressure relief valve according to claim 1, wherein said valve seat is capable of being press fitted to said valve holder, and a stopper step portion for determining a press fitting position is disposed between said valve seat and said valve holder.

3. The pressure relief valve according to claim 1, wherein said valve seat is constituted by a first valve seat part and a second valve seat part, and the press fitted position of the first valve seat part is regulated by as stopper pin mounted to the inner wall surface of said valve holder, and the second valve seat part is positioned in the high-pressure portion side of said valve holder.

4. The pressure relief valve according to claim 1 wherein, said valve holder is formed into a bolt shape, and is provided with either a high-pressure side male screw portion or low-pressure side male screw portion so that the valve holder can be screwed into a pressure apparatus to which this pressure relief valve is mounted.

5. The pressure relief valve according to claim 1, wherein said valve seat is provided with a stopper portion, which makes contact with a stopper end portion of said valve holder, and a seat portion, which makes contact with a metal seat portion of a pressure apparatus to which this pressure relief valve is mounted.

6. A pressure relief valve, comprising:
   a valve holder having a high-pressure portion side end portion facing a high-pressure portion side and a low-pressure portion side end portion facing a low-pressure portion side;
   a valve spring, which is housed inside this valve holder;
   a spring seat on which this valve spring is seated;
   a valve seat, which is mounted to said valve holder; and
   a valve body, which is lifted from this valve seat against the biasing force of said valve spring by fluid pressure of said high-pressure portion side,
   wherein said spring seat is housed in a slidable condition inside said valve holder as a cup-shaped spring seat, and wherein a valve plate, which is capable of moving in the axial direction integrally with said valve body, and is also capable of sliding in the radial direction relative to said cup-shaped spring seat, is interposed between said cup-shaped spring seat and said valve body.

7. The pressure relief valve according to claim 6, wherein, said cup-shaped spring seat is disposed at the opposite end portions of said valve spring, respectively.

8. The pressure relief valve according to claim 6, wherein said cup-shaped spring seat is constituted by a first cup-shaped spring seat and a second cup-shaped spring seat provided at the opposite end portions of said valve spring, respectively, and this first cup-shaped spring seat and second cup-shaped spring seat are capable of sliding inside a spring chamber of said valve holder.

9. The pressure relief valve according to claim 6, wherein, said cup-shaped spring seat is constituted by a first cup-shaped spring seat and a second cup-shaped spring seat provided at the opposite end portions of said valve spring, respectively, and said valve body makes direct contact with the end face of this first cup-shaped spring seat so as to close a central orifice, which is formed in this first cup-shaped spring seat.

10. The pressure relief valve according to claim 6, wherein said cup-shaped spring seat is constituted by a first cup-shaped spring seat and a second cup-shaped spring seat provided at the opposite end portions of said valve spring, respectively, and said valve body is seated on an arc-shaped seat portion of a cross-sectional arc shape, which is formed in this first cup-shaped spring seat.

11. The pressure relief valve according to claim 6, wherein said spring seat is constituted by a first cup-shaped spring seat and a second cup-shaped spring seat provided at the opposite end portions of said valve spring, respectively, and this second cup-shaped spring seat makes contact with the inner wall surface of said closed end portion.

12. The pressure relief valve according to claim 6, wherein said valve body is integrated with said valve plate by a weld portion.

13. The pressure relief valve according to claim 10, wherein said valve seat is capable of being press fitted to said valve holder, and a stopper step portion for determining a press fitting position is disposed between said valve seat and said valve holder.

14. The pressure relief valve according to claim 6, wherein said valve seat is constituted by a first valve seat part and a second valve seat part, and the press fitted position of the first valve seat part is regulated by as stopper pin mounted to the inner wall surface of said valve holder, and the second valve seat part is positioned in the high-pressure portion side of said valve holder.

15. The pressure relief valve according to claim 6, wherein, said valve holder is formed into a bolt shape, and is provided with either a high-pressure side male screw portion or low-pressure side male screw portion so that the valve holder can be screwed into a pressure apparatus to which this pressure relief valve is mounted.

16. The pressure relief valve according to claim 6, wherein said valve seat is provided with a stopper portion, which makes contact with a stopper end portion of said valve holder, and a seat portion, which makes contact with a metal seat portion of a pressure apparatus to which this pressure relief valve is mounted.

17. A pressure relief valve, comprising:
   a valve holder having a high-pressure portion side end portion facing a high-pressure portion side and a low-pressure portion side end portion facing a low-pressure portion side;
   a valve spring, which is housed inside this valve holder;
   a spring seat on which this valve spring is seated;
   a valve seat, which is mounted to said valve holder; and
   a valve body, which is lifted from this valve seat against the biasing force of said valve spring by fluid pressure of said high-pressure portion side,
   wherein said spring seat is housed in a slidable condition inside said valve holder as a cup-shaped spring seat, and wherein there is provided a valve plate, which is disposed between said spring seat and said valve body, and which can be shifted in a radial direction relative to said spring seat.

18. The pressure relief valve according to claim 17, wherein said valve body is integrated with said valve plate by a weld portion.

19. A pressure relief valve, comprising:
   a valve holder having a high-pressure portion side end portion facing a high-pressure portion side and a low-pressure portion side end portion facing a low-pressure portion side;
   a valve spring, which is housed inside this valve holder;
   a spring seat on which this valve spring is seated;
   a valve seat, which is mounted to said valve holder; and
   a valve body, which is lifted from this valve seat against the biasing force of said valve spring by fluid pressure of said high-pressure portion side,
   wherein said low-pressure portion side end portion of said valve holder is closed to form a closed end portion, and, provision is made such that said valve spring is capable of being seated between he inner wall surface of this closed end portion and said spring seat, and wherein there is provided a valve plate, which is disposed between said spring seat and said valve body, and which can be shifted in a radial direction relative to said spring seat.

20. The pressure relief valve according to claim 19, wherein said valve body is integrated with said valve plate by a weld portion.

* * * * *